Feb. 15, 1949.   J. T. PENNINGTON   2,461,567
MULTIPLEX PHOTOGRAPHIC EQUIPMENT SUPPORT
Filed Oct. 31, 1944   2 Sheets-Sheet 1
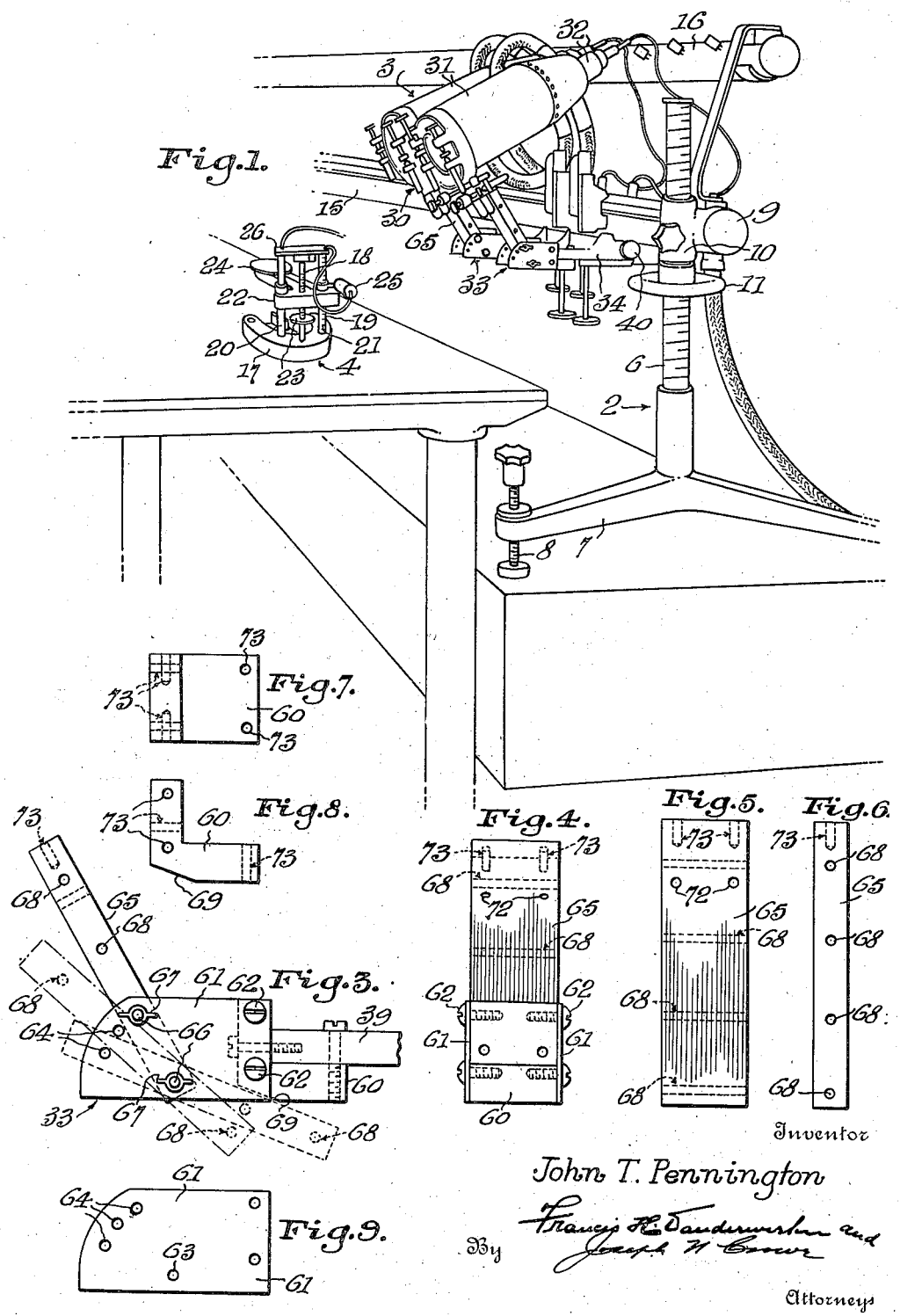
Inventor
John T. Pennington Feb. 15, 1949.  J. T. PENNINGTON  2,461,567
MULTIPLEX PHOTOGRAPHIC EQUIPMENT SUPPORT
Filed Oct. 31, 1944  2 Sheets-Sheet 2
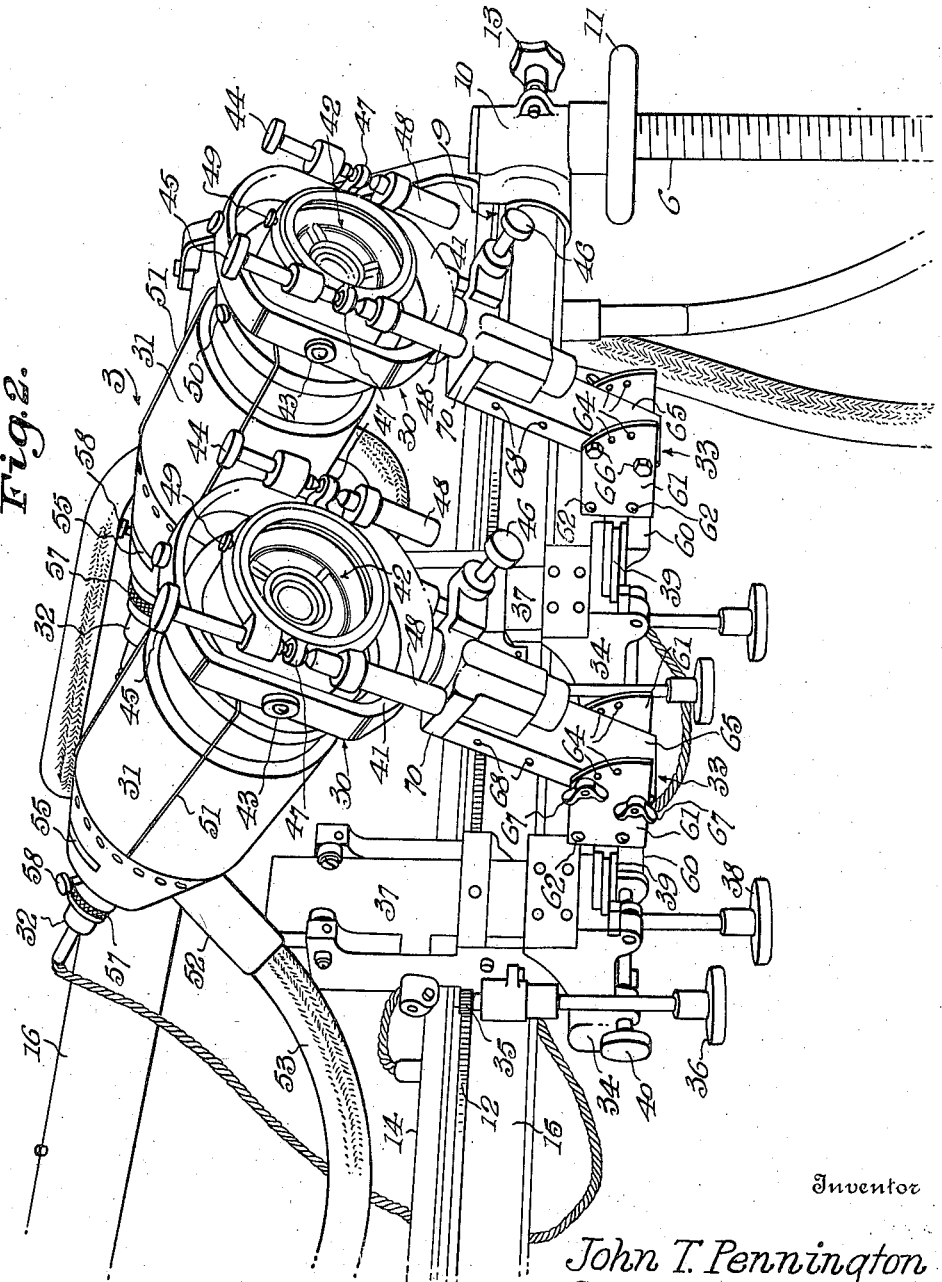
Inventor
John T. Pennington
By
Attorneys Patented Feb. 15, 1949

2,461,567

UNITED STATES PATENT OFFICE 2,461,567

MULTIPLEX PHOTOGRAPHIC EQUIPMENT SUPPORT

John T. Pennington, Alexandria, Va.

Application October 31, 1944, Serial No. 561,247

1 Claim. (Cl. 33—20)

(Granted under the act of March 3, 1883, as amended April 30, 1928; 370 O. G. 757)

The invention described herein may be manufactured and used by or for the Government for governmental purposes, without payment to me of any royalty thereon.

This invention relates to stereoscopic projections and particularly an adapter for multiplex projectors. More particularly, it is directed to a device positioned intermediate a multiplex projector and its mount for selectively varying the angle of projection to accommodate oblique aerial photographs employed in the projection of stereoscopic models from which both planimetry, elevation and contours may be plotted.

In the past, it has been the practice to project vertical diapositives which may be stereoscopically observed and measured to obtain detail for compilation into a conventional map on paper. This required highly controlled flights for taking the vertical pictures which are necessary for accurate plotting of vertical stereoscopic models projected therewith. Since this high degree of controlled level flight is difficult to obtain and the standard aerial camera now employed by the air force is the tri-Metrogon 60° oblique camera, it has become necessary to devise some means for adapting the oblique diapositives to stereoscopic models for plotting maps, preferably using the available vertical multiplex equipment. Previous investigators of this problem have directed their efforts towards means of obtaining elevation data from the oblique aerial photographs by either computation from coordinate measurements on the tilted photographs or by some graphical means which could be used satisfactorily in conjunction with the present equipment and methods for the compilation of planimetry. These investigations showed that one thousand foot interval contours could not be accurately plotted by these methods and the tedious process of computing numerous spot elevations for the interpolation of contours was impractical.

Accordingly, it is an object of this invention to provide intermediate a multiplex projector and the mounting means therefor, a device adapting vertical multiplex stereoscopic mapping equipment suitable for oblique diapositives.

Another object of this invention is to provide a device of the class herein described which will accommodate oblique diapositives without destroying the translatory and rotational movement of the projectors.

A further object of this invention is to provide a device of the class herein described which will accommodate oblique diapositives of any angle up to 70°.

A still further object of this invention is to provide a device of the class herein described which will be economical, efficient, and durable.

The foregoing and other objects of this invention will be more apparent from reading the specification in conjunction with the drawings, forming a part thereof, wherein:

Fig. 1 is a perspective view of the multiplex mapping equipment with the adapter interposed between the projectors and mounting means;

Fig. 2 is a perspective view of the multiplex projector stereoscopically mounted with the adapter set for 60° oblique diapositives;

Fig. 3 is a side elevation of the adapter with various details shown by dotted lines;

Fig. 4 is an end elevation of Fig. 3;

Fig. 5 is a face elevation of the movable elevating bar of the adapter;

Fig. 6 is a side elevation of Fig. 5;

Fig. 7 is a plan view of the angle bar of the adapter;

Fig. 8 is a side elevation of the angle bar; and,

Fig. 9 is a side elevation of the adapter plates.

In the drawings where like members are given the same reference numeral, the multiplex mapping equipment generally consists of a table, a projector supporting frame 2, two or more projectors 3, a tracing table 4; and, a pair of stereoscopic spectacles, a cooling unit, and a voltage regulator not shown.

The surface of the table is the plane upon which the map is drawn and it is important, therefore, that this surface be a true plane since it supports the medium upon which the map is compiled while moving the tracing table 4 thereover to trace the detail from the projected stereoscopic model. Any table of sturdy construction and having a surface flat and true within one thousandth of an inch of any linear foot is satisfactory. Leveling means should be provided in the table structure, preferably in the form of adjusting pin associated with the legs supporting the table surface.

The standard projector supporting frame 2 consists essentially of two upright threaded elevating bars 6 secured to the base plates 7 which may be leveled by leveling screws 8. A support bar 9 has a support bracket 10 adapted to slide over the elevating bars 6 and be adjusted by a threaded handwheel 11 associated therewith. A face bar 15 and a rack 12 attached thereto, the clamping means 13, level vials, connector and switch panel 14, guard rail and cooler head 16 are connected with the support bar 9.

The tracing table 4 is that part of the multiplex equipment which is used for viewing the stereoscopic model, measuring elevation in the model, and compiling the detail on the map sheet. It has a horseshoe-shaped base 17, preferably resting on adjustable quartz foot pads and three upwardly extending columns, the center one being an elevating screw 18 and the others being guide columns 19 and 20 one of which is provided with a scale 21. A collar on yoke 22 slides over these columns and has a threaded section operably connected with the elevating screw 18 which may be rotated by a knurled knob 23. A screen 24 with a floating mark is operably connected with the yoke 22 as is a sighting device 25 with a vernier for reading the elevation of the screen 24 on the scaled column 19. A clamp 26 is provided for holding the columns in parallel relationship as well as holding the screen at any desired setting. A suitable pencil holder is provided on the base 17 in alignment with the screen floating mark. Suitable illuminations are provided with this device.

The above discussed equipment are standard items previously used in vertical stereoscopic model projecting and viewing. This invention relates to an adapter for the projector, which will now be discussed. The projector consists of four main parts designated generally as a body 30, condenser 31, lamphead 32, and adapter 33. This assembly is that part of the equipment which projects a reduced copy of the oblique aerial negative in a manner such that the portion of the earth's surface photographed may be reconstructed in miniature on a spatial model. The body, condenser, and lamphead are standard items of vertical multiplex equipment adapted to oblique model utility by this invention.

The generally designated projector body 30 may be viewed as a small scale reproduction of the camera mounted so that it may rotate about and translate along a plurality of axes. The projector body is suspended from the supporting frame by a divided bracket 34 adapted to fit over the face bar 15. Movement along the face bar 15 and rack 12, known in the art as "X" movement, is obtained by the engagement of a pinion 35, on a shaft operated by a knob 36, with the rack 12. Movement in the vertical direction, known as "Z" movement, is accomplished by a vertical bar 37 slidably mounted in the bracket 34 and movably operated by a knob 38, this vertical bar 37 being securely attached to the lower portion of this divided bracket 34. A horizontal bar 39 is slidably mounted in the lower segment of the divided bracket 34 and operated by a knob 40, which moves the projector in a line perpendicular to the face bar 15 and rack 12, which is known in the art as "Y" movement. Attached to the horizontal bar 39 is the adapter, generally designated as 33, which is secured to a ring 41 holding the lens assembly 42 by two opposed pivots 43.

Rotation of the projector cone about the "X," "Y," and "Z" axes, known in the art as tilt, tip, and swing, respectively, is accomplished by the action of the screws 44, 45, and 46 acting on the levers 47 positioned by spring plungers 48. The tilt and tip motions can be moved approximately 10° in either direction, but the swing movement is limited to a relatively small angle in the direction opposing the spring plunger. A clamp screw 49, however, may be loosened to permit 360° swing movement by manual operation. The diapositive may be centered on the stage plate by the four opposed plungers actuated by the thumb screws 50.

The condenser 31 fits snugly over the projector body 30, and is held thereon by a substantially U-shaped steel spring member 51. A spout 52 is provided for attaching a hose 53 connected to the cooler head 16 and a slot 55 is provided intermediate the light source and condensing lens to receive red or blue-green filter slides. The top of the condenser is threaded to receive and retain the lamphead 32.

The lamphead 32 is secured to the condenser by an internally threaded knurled ring. Means are provided for centering the filament of the light source longitudinally by rotating the knurled collar 57, and, transversally by two adjusting screws 58.

The adapter 33 consists of an angle bar 60 to which is attached two side plates 61 by means of the screws 62, inserted through apertures in the side plates and engaging threaded holes in the angle bar 60. These plates 61 have an aligned central hole 63 and three spaced holes 64 arcuately disposed with respect to the first center hole 63. These radially spaced holes are on lines equiangular apart, namely 20°, forming 20°, 40° and 60° elevations. An elevating bar 65 is adapted to slide between the side plates 61 and be secured thereto by the bolts 66 and the nuts 67 passed through it and the central holes 63 and one of the radially spaced holes 64. To accommodate the bolts 66, retain the center of gravity of the projector and condenser at approximately the same relationship at all elevations, and also provide sufficient clearance for the condenser over the vertical bar 37, the elevating bar 65 is provided with four transversal equidistance holes 68 having a distance therebetween comparable to the distance between the central hole 63 and the radial holes 64 so as to align therewith. When the oblique angle is increased, the elevation of the bar 65 is correspondingly increased by employing the next set of holes 68 in the bar 65, see Fig. 3. Thus, by keeping the center of gravity of the projector and condenser in substantially the same position as in normal vertical operation, no additional torques or strains are placed on the multiplex frame or bracket. The employment of the elongated bar 65, however, necessitates a clearance angle 69 being provided in the angle bar 60. The adapter 33, therefore, becomes the connecting link between the divided bracket mounting 34 and the projector body 30 by the screws connecting the angle bar 60 to the horizontal bar 39 and by screws connecting the elevating bar 65 to a projector ring stud 70 through apertures 72 and threaded holes 73 provided in the appropriate members.

In operation, the projector assemblies are set up in bank and approximately at the same oblique angle as the taking camera. This may be accomplished for any angle from 0° to 70° since the adapter radial holes 64 are spaced at 20°, 40° and 60° and the projector head possesses 10° variation in either direction, the usual oblique aerial photograph being 60°. The preferred vertical distance between the table and projector is approximately 235 mm. It has been determined that the optimum plotting scale for 60° oblique models is 1:1.3 times the flight altitude in feet. Thus for a flight altitude of twenty thousand feet, the optimum plotting scale is 1:26,000. With a photograph flight control of sixty percent overlap, such a scale will permit half inch clearance between projectors; accordingly, with overlaps greater than sixty percent it is necessary to plot the obliques on a larger scale. This latter condition may be satisfactorily plotted in the area inside the principal points.

Having thus described my invention, what I claim as new and wish to secure by Letters Patent is:

An adapter for a multiplex projecting device comprising two spaced parallel plates, an angle bar, formed with an angularly cut away clearance portion, rigidly mounting said plates, a second bar pivotally mounted on the plates intermediate thereof, and angularly adjustable therebetween, the extent of said angular adjustment being increased by the cut away clearance portion of said angle bar, and means for selectively securing said angularly adjustable bar to said plates in a predetermined position.

JOHN T. PENNINGTON.

REFERENCES CITED

The following references are of record in the file of this patent:

UNITED STATES PATENTS

| Number | Name | Date |
| --- | --- | --- |
| 2,079,090 | Von Gruber | May 4, 1937 |
| 2,138,600 | Harmon | Nov. 29, 1938 |
| 2,247,436 | Erickson | July 1, 1941 |